(12) United States Patent
Schneider et al.

(10) Patent No.: US 6,415,675 B1
(45) Date of Patent: Jul. 9, 2002

(54) SLIDE-OUT DRIVE GEAR BOX LOCK

(75) Inventors: Robert H. Schneider, Beaver Dam; Jeffrey N. Ashbeck, Wisconsin Rapids, both of WI (US)

(73) Assignee: Actuant Corporation, Glendale, WI (US)

( * ) Notice: Subject to any disclaimer, the term of this patent is extended or adjusted under 35 U.S.C. 154(b) by 5 days.

(21) Appl. No.: 09/710,668

(22) Filed: Nov. 10, 2000

Related U.S. Application Data

(60) Provisional application No. 60/165,326, filed on Nov. 12, 1999.

(51) Int. Cl.[7] ............................................... F16H 57/10
(52) U.S. Cl. ..................... 74/411.5; 74/530; 296/26.13; 188/69
(58) Field of Search ................................ 74/422, 411.5, 74/530, 813 L; 296/26.01, 26.09, 26.13; 188/31, 69, 265, 60; 52/67

(56) References Cited

U.S. PATENT DOCUMENTS

| | | | | |
|---|---|---|---|---|
| 5,560,444 A | * | 10/1996 | Tiedge ..................... | 296/26.13 |
| 5,758,918 A | * | 6/1998 | Schneider et al. ........ | 296/26.13 |
| 5,833,296 A | * | 11/1998 | Schneider ................ | 296/26.13 |
| 6,116,671 A | * | 9/2000 | Schneider ................ | 296/26.01 |
| 6,257,638 B1 | * | 7/2001 | Graber ..................... | 296/26.09 |

\* cited by examiner

*Primary Examiner*—Paul N. Dickson
*Assistant Examiner*—Mariano Sy
(74) *Attorney, Agent, or Firm*—Quarles & Brady LLP

(57) ABSTRACT

A gear driven slide-out system has a radially fixed gear rack which can be slid axially into or out of engagement with a gear in a manual gearbox which is in driving engagement with the drive shaft. The fixed gear rack is biased into engagement so as to lock the drive shaft and is disengaged by a hand operated rotary cam.

5 Claims, 6 Drawing Sheets

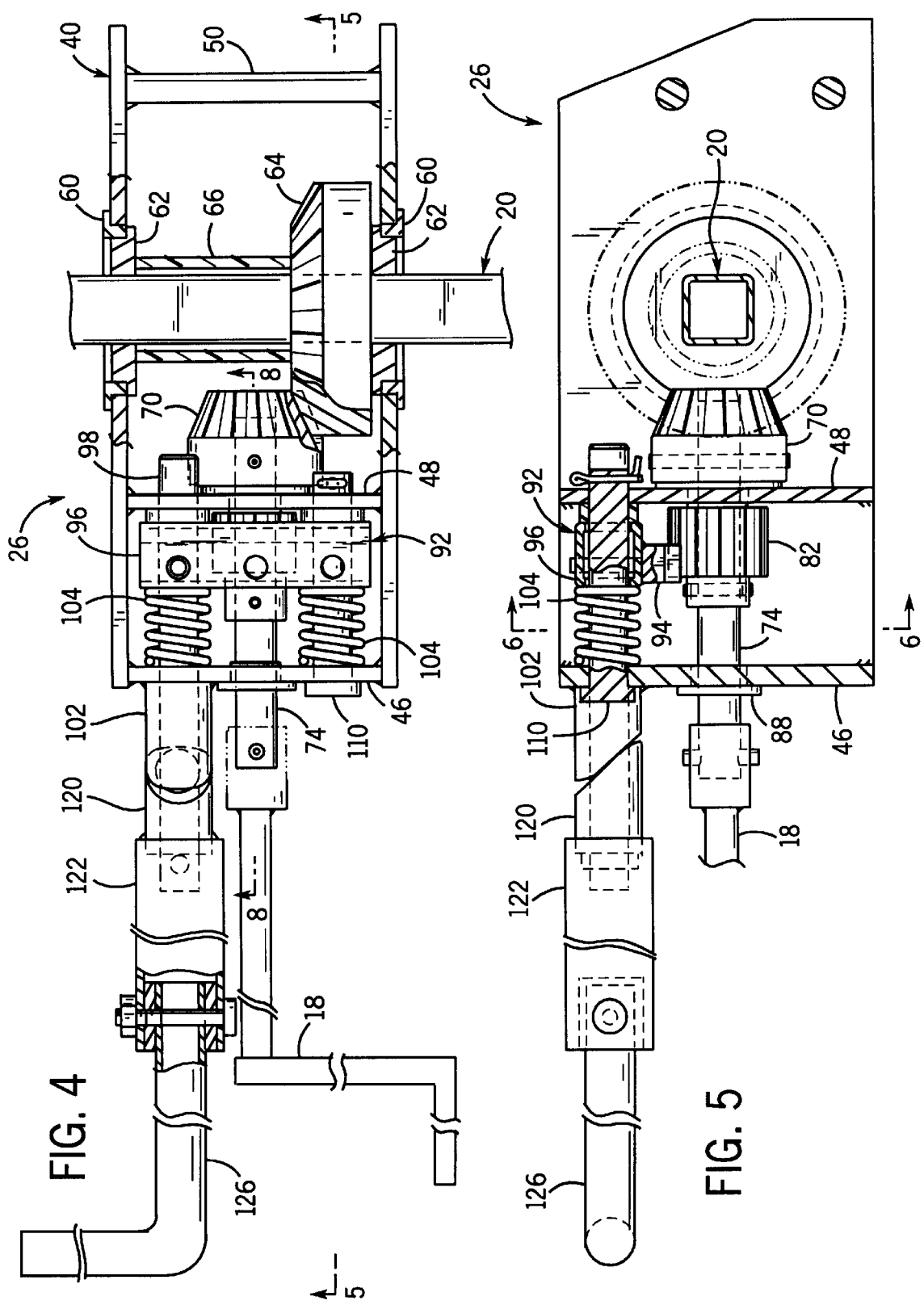

SLIDE-OUT DRIVE GEAR BOX LOCK

CROSS REFERENCE TO RELATED APPLICATIONS

This claims the benefit of U.S. Provisional Patent Application No. 60/165,326 filed Nov. 12, 1999.

STATEMENT REGARDING FEDERALLY SPONSORED RESEARCH OR DEVELOPMENT

Not Applicable.

BACKGROUND OF THE INVENTION

1. Field of the Invention

This invention relates to slide-out drive mechanisms of the type that are used in recreational vehicles for enlarging the space inside the vehicle when the vehicle is parked.

2. Discussion of the Prior Art

Slide-out drive systems for recreational vehicles, e.g., trailers and motor homes, for sliding out a room to enlarge the space of the vehicle when it is parked, are known from patents such as U.S. Pat. No. 5,833,296 ("the '296 patent"), the disclosure of which is hereby incorporated by reference. Referring to FIG. 1, in such a system, one or more (two as illustrated) telescoping rails 12 have their outer ends 14 attached to the room section to be slid out and are driven by a drive means, which may include an electric motor 16 and/or hand cranks 18, at one or more locations which are accessible to the user. By turning the shaft 20 in one direction or the other, the rails 12 are either extended or retracted. As disclosed in the '296 patent, when an electric motor 16 is provided, it is preferred to have the motor include a brake to keep the rails 12 retracted when the room is retracted, and extended when it is extended.

However, particularly if the dive system is strictly a manually driven system, or if it is driven with an electric motor which does not have a brake, other means must be provided to keep the rails 12 retracted in a fixed position. In the past, such means have included travel bars, which typically may be a bar that makes physical contact with the slide-out room and a fixed part of the recreational vehicle to keep the slide-out room retracted during travel. It is an object of the present invention to provide a means to keep the room retracted, or extended, as an alternative to the use of slide-out travel bars or similar means.

SUMMARY OF THE INVENTION

A slide-out drive system of the present invention may be the same as that disclosed in the '296 patent except that in the present invention there is a gear lock on the shaft which is used to drive the rails in and out. As disclosed in the '296 patent, this shaft drives gears which mesh with racks which are fixed to the slide-out rails. The shaft is driven by an electric motor, typically through a gear box, or by a hand crank through a gear box. According to the present invention, a radially fixed gear can be moved axially into and out of engagement with one of the gears that is in driving engagement with the shaft so as to lock the rotation of the shaft or not The fixed gear may be advantageously provided in a manual drive gearbox. That way, whether an electric motor is provided to drive the system or not, the braking function of the fixed gear will still be available. If a motor is not provided, the manual gearbox is the primary means to drive the slide-out, whereas if a motor is provided, the manual gearbox functions as a backup in case of power or motor failure.

In addition, the fixed gear is preferably moved axially into or out of engagement with the gear that is in driving engagement with the drive shaft of the rails by a hand operated cam mechanisms The hand operated cam mechanism gives good tactile feedback and assurance to the user that the system is locked in place and also provides a simple means of applying or releasing the lock.

The foregoing and other objects and advantages of the invention will appear in the detailed description which follows. In the description, reference is made to the accompanying drawings which illustrate a preferred embodiment of the invention.

DESCRIPTION OF THE DRAWINGS

FIG. 4 is a partial sectional view from the plane of the line 4—4 of FIG. 2;

FIG. 5 is a sectional view from the plane of the line 5—5 of FIG. 4;

DETAILED DESCRIPTION OF THE PREFERRED EMBODIMENT

Figure 1:
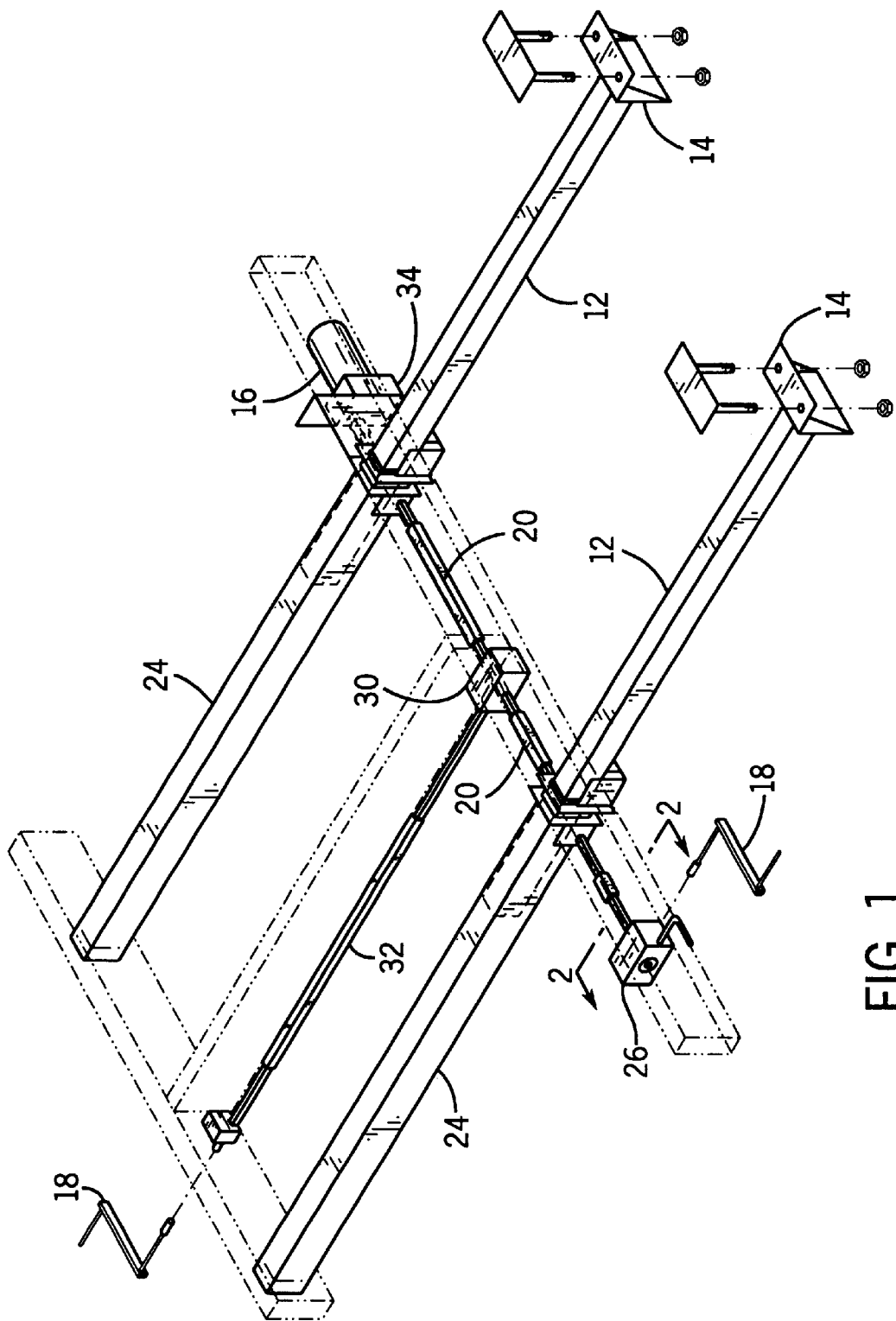
FIG. 1 is a perspective view of a vehicle room slide-out operating mechanism incorporating the present invention.

As mentioned above, the shaft 20, which is comprised of rod sections with square ends which are coupled to one another by fitting into square tubes, has pinion gears mounted on it which are in meshing engagement with racks that are welded or otherwise affixed to the slide-out rails 12. The slide-out rails 12 are retracted into outer tubes 24 which are fixed to the frame of the vehicle. Gear boxes 26, 30 and 34 of the drive system are affixed to the frame of the vehicle, and the shaft 20 is journalled in the gear boxes.

In the case of the embodiment illustrated, the gear box 26 is the gear box which is provided with a lock gear of the invention Another gear box 30 is provided in driving engagement with the shaft 20 which houses a set of bevel gears to convert and reduce the rotary motion of shaft 32 imparted by the crank 18 on the opposite side of the vehicle, to drive the shaft 20. The motor 16 also drives the shaft 20 through a gear box 34, but it is preferred to provide a lock gear of the invention at the manual gear box 26 since that is where an operator interface is provided.

Referring to FIGS. 2–6, the gearbox 26 includes a steel housing 40 in which is journalled drive coupling 42. Drive coupling 42 has a square hole in its center in which a square end of shaft 20 is inserted so as to establish driving engagement between the shaft 20 and the coupling 42. The side walls 44 are bridged at their front by bridging walls 46 and 48 which are spaced apart and welded at their ends to the side walls 44. The side walls 44 are bridged at their rear by two spaced apart rods 50 which are welded at their ends to the side walls 44. The walls 44, 46, and 48 may, for example, be ⅜ inch thick steel plate and the rods may be, for example, ¼ inch diameter steel rod. The housing 40 is preferably closed off on its top and bottom by sheet metal plates 54 and 56, which may be secured by bolts 61.

Figure 2:
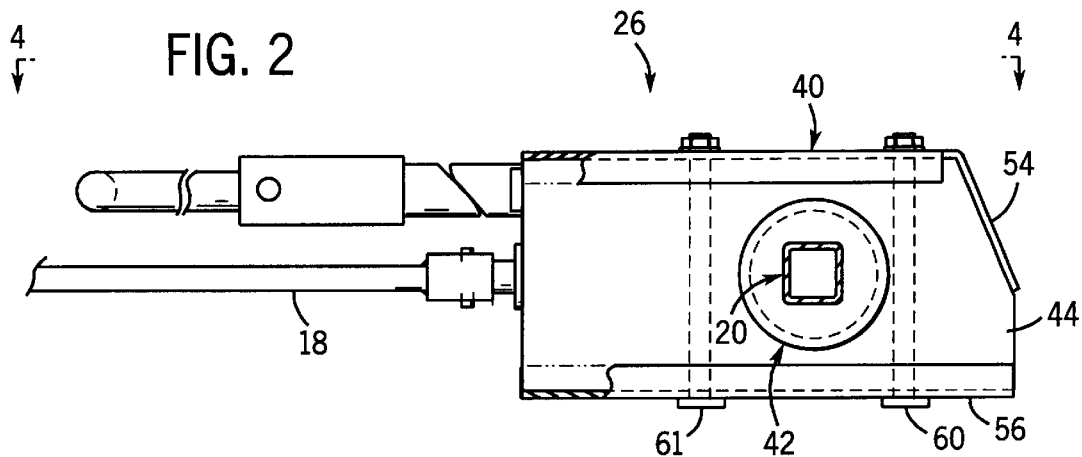
FIG. 2 is a partial sectional view from the plane of the line 2—2 of FIG. 1.
Figure 6:
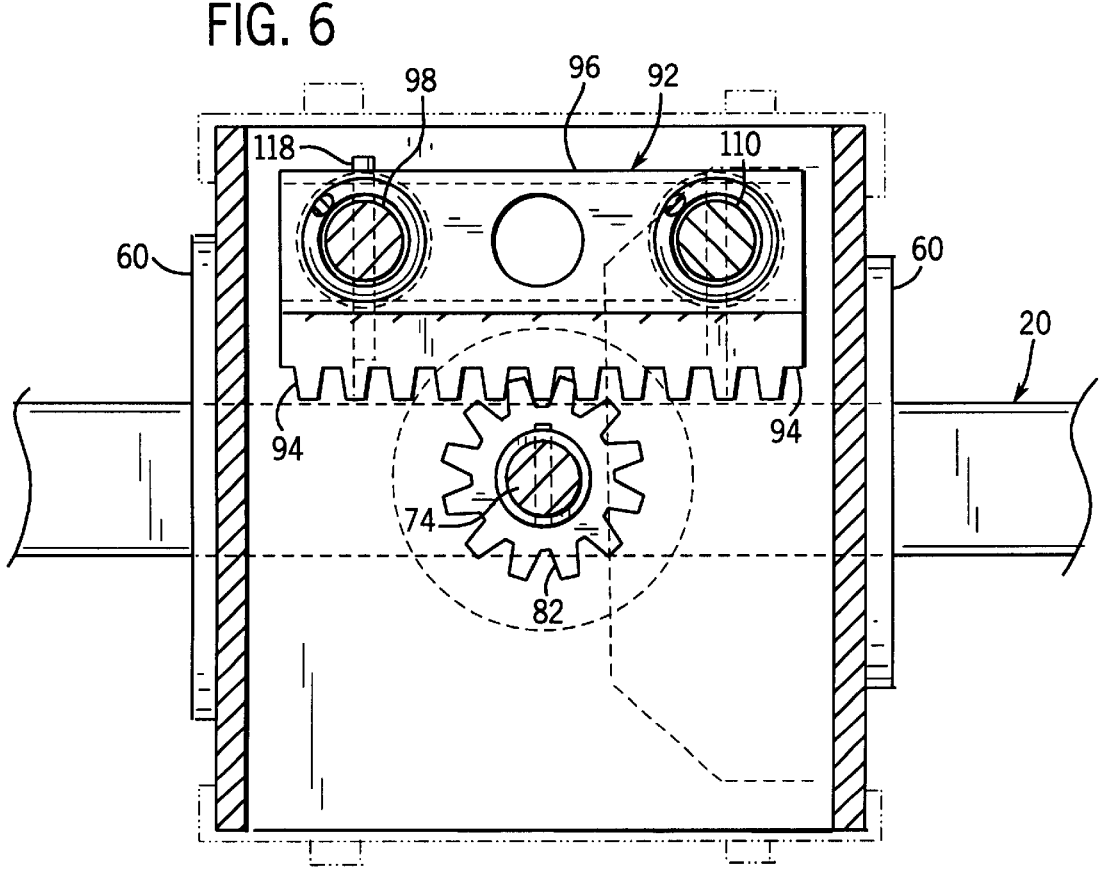
FIG. 6 is sectional view from the plane of the line 6—6 of FIG. 5.
Figure 3:
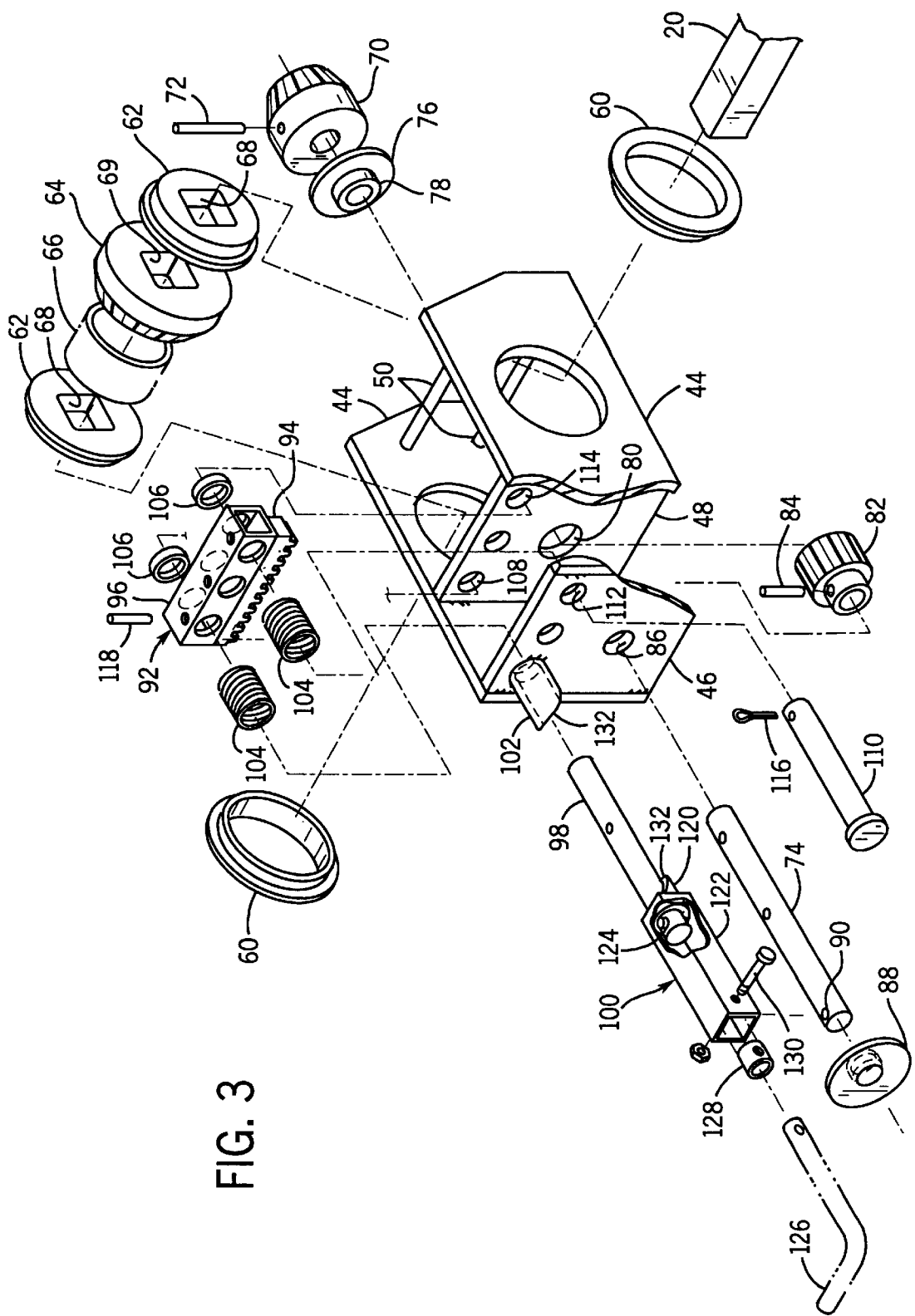
FIG. 3 is an exploded perspective view of the gear box illustrated in FIG. 2.

The coupling 42 includes a pair of bearings, each having an outer race 60 and an inner race 62, a bevel gear 64, and a spacer 66. The portion of shaft 20, which may be either solid square or tubular square (tubular as illustrated in FIG. 2), which extends through the coupling 42 fits into the square holes 68 and 69 in the inner races 62 and bevel gear 64 to be driven by the bevel gear 64.

The gear 64 is driven by bevel gear 70 which is pinned by pin 72 to shaft 74. Shaft 74 is inserted into journal bearing 76 which has its quill portion 78 received in bore 80 of plate 48. Gear 82 is pinned by pin 84 to shaft 74. Shouldered journal bearing 88 has its quill portion received in hole 86 in plate 46, and the bearing 88 journals the shaft 74. The shaft 74 has a hole 90 at its outer end so that a crank handle 18 can be pinned to the shaft 74 so as to manually turn the gear 70, which turns the gear 64, which drives the shaft 20.

The gear box 26 also includes a locking element 92 which is made up of a lock gear 94 which is welded, pinned, or otherwise affixed to a member 96 which can be moved in a direction which is parallel to the axis of the gear 82. Shaft 98 of lock actuator 100 is inserted through cam element 102, which is welded to plate 46, through a hole in plate 46, through compression spring 104, through holes in the side walls of member 96, through spacer 106, and through hole 108 of plate 48. At the opposite end of the element 92, pin 110 is inserted through hole 112 of plate 46, through another compression spring 104, through holes in the side walls of the element 96, through another spacer 106, and through a hole 114 in the plate 48. Pin 110 is secured in axial position by pin 116. Thus, since element 92 is pinned to shaft 98 by pin 118, shaft 98 moves axially with the element 92, and the element 92 slides on the pin 110.

The compression springs 104 bias the element 92 so as to compress the spacer 106 against wall 48 when the lock gear 94 is engaged with the pinion 82. A second cam element 120 is welded or otherwise affixed to handle coupling element 122. Shaft 98 is inserted through the cam element 120 and secured inside the coupling element 122 by a pin 124. An actuator handle 126 is pinned to the opposite end of coupler 122 by bush 128 and fastener 130.

Figure 7:
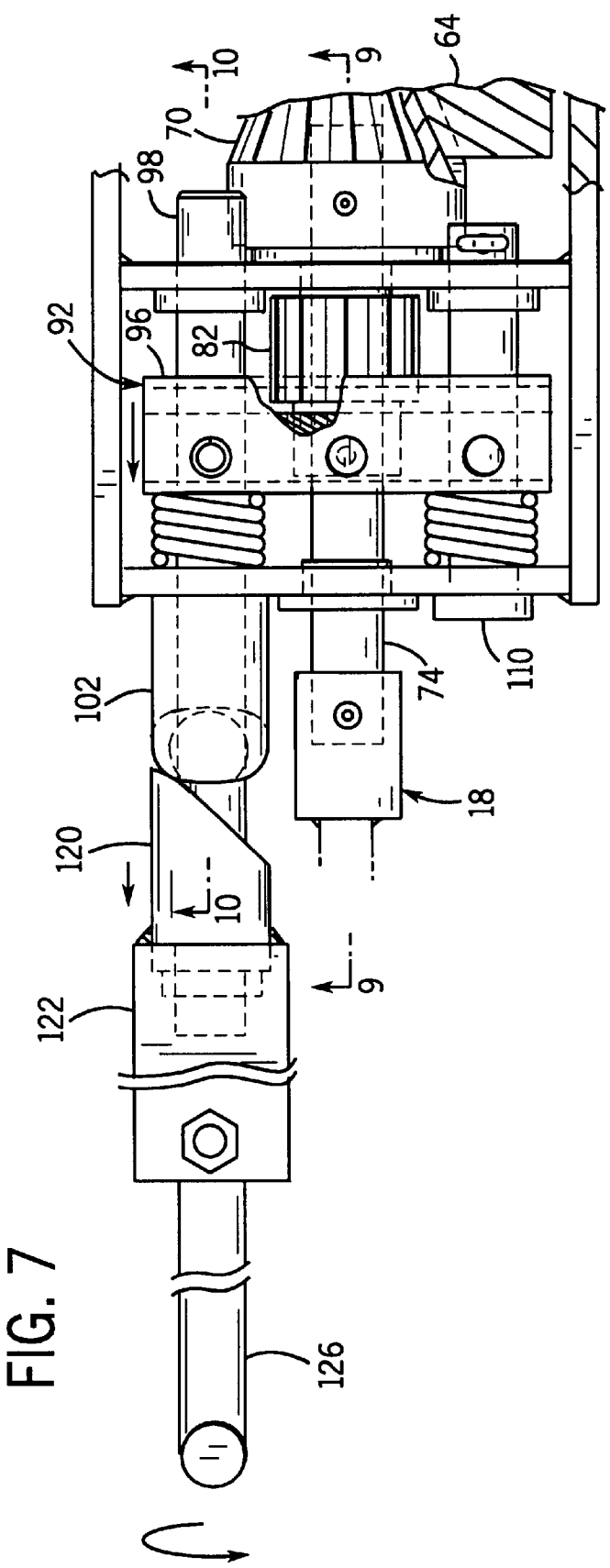
FIG. 7 is a fragmentary view similar to FIG. 4 illustrating the lock gear moved to a disengaged or unlocked, position.
Figure 8:
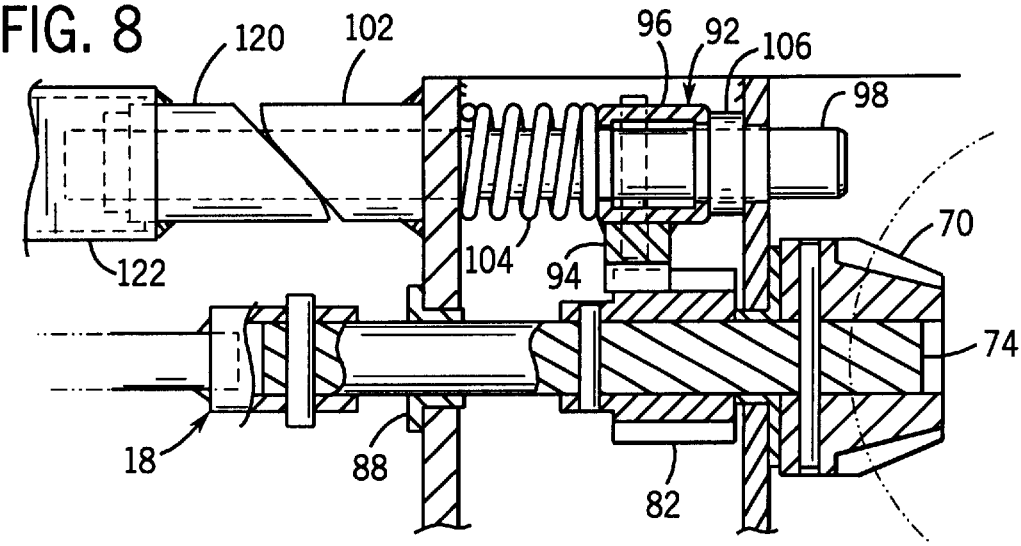
FIG. 8 is a side sectional view from the plane of the line 8—8 of FIG. 4 illustrating the lock gear in an engaged, or locked, position.
Figure 9:
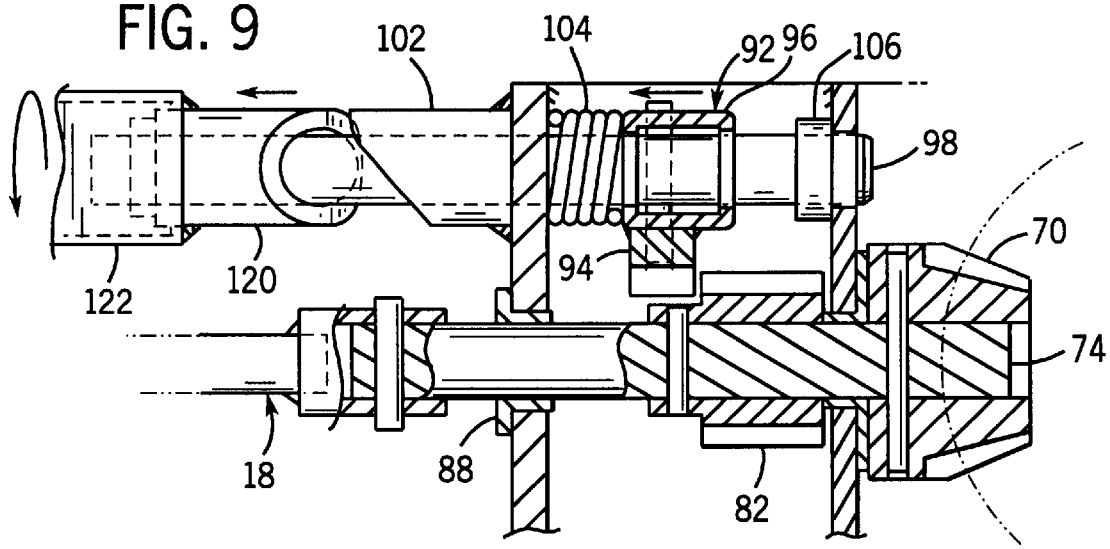
FIG. 9 is a view similar to FIG. 8 but from the plane of the line 9—9 of FIG. 7 illustrating the lock gear moved to the unlocked or disengaged position.
Figure 10:
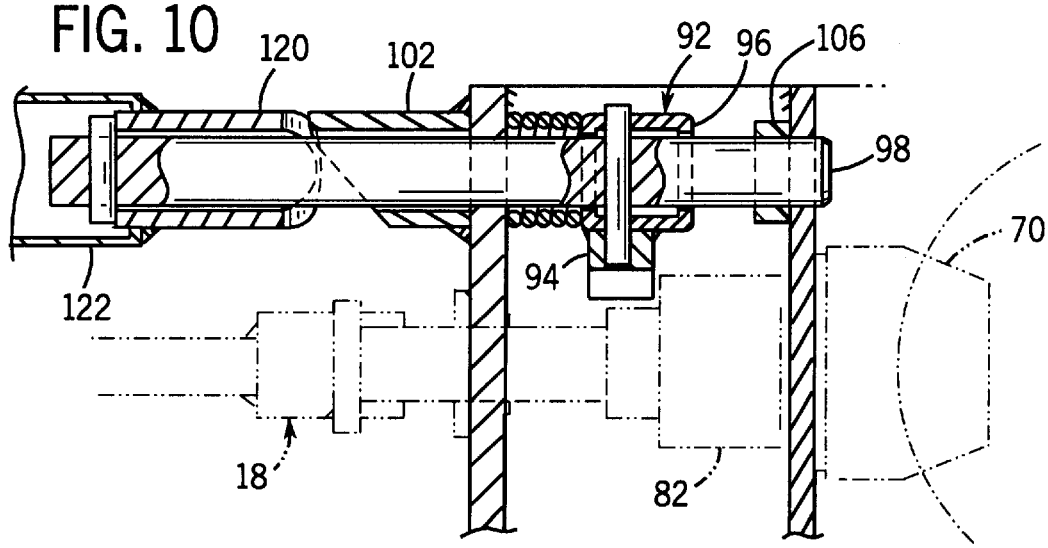
FIG. 10 is a sectional view from the plane of the line 10—10 of FIG. 7 illustrating the mechanism for moving the lock gear.

The elements 102 and 120 have mating cam surfaces 132 which are ramped so that when the handle 126 is turned from the engaged position of FIGS. 4, 5, and 8, to a disengaged position as in FIGS. 7, 9, 10, the rotary motion is converted to axial motion. When the handle 126 is turned, the cam surfaces 132 cause the shaft 98 to retract from the housing 40, carrying with it the locking element 92, which disengages the lock gear 94 from the gear 82. In the disengaged position, the shaft 74 is able to be turned by a crank 18, or by the motor 16, if a motor is provided. When the lock gear 94 is engaged with the gear 82, the shaft 74 cannot be turned either manually or by the motor 16 since the rotation of the shaft 20 is locked by the engagement of the gear 94 with the gear 82. Since the shaft 20 cannot turn, the sliding rails are secured in whatever position of extension or retraction they are in.

As shown in FIG. 7, the end of at least one of the cam elements 102 or 120, or preferably both, have broad or flat ends at the end which the cam surface 132 tapers to. This is so that when the handle is turned to the disengaged position, it will stay in that position even when it is released.

The invention provides a positive lock of the rails 12, using materials which are the same as or similar to other materials used in other portions of the drive system. It provides this in a simple mechanism with good tactile feed back to a user and the ability to visually tell if the system is locked, for example by observing the position of the element 120. It also provides this lock at a gear reduced element of the slide-out drive train, i.e., on the reduced side of the bevel gear pair 70, 64, thereby making it a very strong and positive lock.

Many modifications and variations to the preferred embodiment described will be apparent to a person skilled in the art. Therefore, the invention should not be limited to the scope of the embodiment described.

We claim:

1. In a slide-out drive system having at least one rail which is extended and retracted by a gear meshing with a gear rack, said gear being driven by a drive shaft which is in driving engagement with a second gear, the improvement wherein a third gear is radially fixed relative to said second gear and is slidable axially relative to said second gear into and out of engagement with said second gear so as to lock the rotation of the shaft.

2. The improvement of claim 1, wherein said second gear is in a manual drive gearbox of said system.

3. The improvement of claim 2, wherein said third gear is a gear rack.

4. The improvement of claim 3, wherein said third gear is moved into or out of engagement with the second gear by a hand operated cam mechanism.

5. The improvement of claim 1, wherein said third gear is biased into engagement with said second gear.

* * * * *